US006372694B1

(12) United States Patent
Osinga et al.

(10) Patent No.: US 6,372,694 B1
(45) Date of Patent: Apr. 16, 2002

(54) SUSPENSIONS WITH HIGH STORAGE STABILITY, COMPRISING AN AQUEOUS SILICATE SOLUTION AND A FILLER MATERIAL

(75) Inventors: Theo Jan Osinga, Cadier en Keer (NL); Ian Maurice Howarth, Delamere (GB)

(73) Assignee: Crosfield Ltd., Cheshire (GB)

( * ) Notice: Subject to any disclaimer, the term of this patent is extended or adjusted under 35 U.S.C. 154(b) by 0 days.

(21) Appl. No.: 09/403,839

(22) PCT Filed: Apr. 27, 1998

(86) PCT No.: PCT/GB98/01225

§ 371 Date: Oct. 27, 1999

§ 102(e) Date: Oct. 27, 1999

(87) PCT Pub. No.: WO98/49116

PCT Pub. Date: Nov. 5, 1998

(30) Foreign Application Priority Data

Apr. 30, 1997 (GB) ................................ 9708831

(51) Int. Cl.[7] ................ C09K 7/02; C04B 12/04; B05D 5/10; B32B 9/06
(52) U.S. Cl. .................. 507/140; 507/141; 507/145; 106/626; 106/600; 106/636; 162/124; 427/207.1; 428/449
(58) Field of Search ................ 507/140, 141, 507/145; 106/626, 600, 636; 162/124; 427/207.1; 428/449

(56) References Cited

U.S. PATENT DOCUMENTS

| 4,035,265 A | * | 7/1977 | Saunders | .................... 106/626 |
|---|---|---|---|---|
| 4,505,751 A | | 3/1985 | Sydansk | |
| 4,550,032 A | * | 10/1985 | Compen et al. | ............ 252/510 |
| 4,630,667 A | * | 12/1986 | Labate | ........................ 164/363 |
| 5,147,460 A | * | 9/1992 | Otaki | ......................... 106/626 |
| 5,575,953 A | * | 11/1996 | Tachizono | ................... 106/626 |

FOREIGN PATENT DOCUMENTS

| DE | 33 25 467 | | 1/1984 |
|---|---|---|---|
| DE | 36 00 628 | | 7/1987 |
| EP | 0 458 504 | | 11/1991 |
| GB | 2058128 | * | 4/1981 |

OTHER PUBLICATIONS

Chemical Abstracts, vol. 117, No. 8, Aug. 24, 1992, Columbus Ohio, US abstract No. 75311v, S. Tabei et al., p. 350; XP000375942 see abstract & JP 04 080 290 A (ID.).
Database WPI week 8221, Derwent Publications Ltd., London, GB; AN 82–42088e XP002073054 & JP 57 061 616 A (Lion Corp) see abstract, (1982).
Database WPI week 8239, Derwent Publications Ltd., London, GB; AN 82–82437E XP002074094 & JP 57 135 716 A (Nippon Chem Ind Co) see abstract, (1982).
Database WPI week 8348, Derwent Publications Ltd., London, GB; AN 83–829054 XP002074095 & JP 58 178 298 A (Hitachi Ltd) see abstract, (1983).
Database WPI week 8401, Derwent Publications Ltd., London, GB; AN 84–003535 XP002074096 & JP 58 199 763 A (Fujii M) see abstract, (1984).

* cited by examiner

Primary Examiner—Philip Tucker
(74) Attorney, Agent, or Firm—Pillsbury Winthrop LLP

(57) ABSTRACT

Suspension, having a high storage stability, comprising an aqueous silicate solution and a filler material, wherein the silicate solution has a silicate content of at least 20% by weight, the filler material has an average particle size of 0.8 to 15 µm and a specific weight of below 2.75 Kg/l.

28 Claims, No Drawings

SUSPENSIONS WITH HIGH STORAGE STABILITY, COMPRISING AN AQUEOUS SILICATE SOLUTION AND A FILLER MATERIAL

The present invention relates to suspensions, having a high storage stability, comprising an aqueous silicate solution and filler material.

Such a suspension is for instance disclosed in U.S. Pat. No. 4,361,659. Said suspension comprises crystalline calcium carbonate and quartz powder as fillers. To obtain a reasonable stability, an alkali resistant organic polymer is included in the suspension.

Organic chemicals are frequently not desirable in environmentally/health sensitive applications. Safety can be a serious issue when applied in the proximity of higher temperature equipment, e.g. when dried at higher temperatures. Furthermore, suspensions stabilized with organic stabilizers are also very sensitive to small variations in composition. For instance they may turn into gels during storage in case of slight overdosing of the stabilizing agent. Further suspensions stabilized with organic compounds are often not stable any more when only slightly diluted or at a different ionic strength of the aqueous phase.

In U.S. Pat. No. 4,403,059, a composition is described based upon an aqueous solution of alkali metal silicate with a content from 10 to 40% by weight of a powdered inorganic filler, having a good storage stability by using at least one zinc soap of a fatty acid, having from 12 to 22 carbon atoms as a stabilizer. With the composition according to this US-patent specification it is difficult to define the specific amount of organic stabilizer needed for optimum control of the stability, without excessively increasing the viscosity.

Furthermore the use of stabilizers containing zinc soap and polymers limits the possible application areas of such a suspension as a result of environmental and safety requirements.

Suspensions may also be stabilized with inorganic stabilizers as inorganic clays, with particles of around 0.1 micrometer in diameter, which clays are also used as thickeners, having swelling properties. Further these stabilizers may interfere with other components used in the specific composition.

Suspensions stabilized with inorganic stabilizers have generally high viscosities, due to the thickening properties of the stabilizer, which limits the applicability as well as the level of solids, that can be added.

In this respect reference is made to GB-A-2 058 818, in which an aqueous spray coating adhesive composition is disclosed comprising (i) a solution of an alkali metal silicate (ii) 1 to 10% by weight of finely divided inorganic powder containing, mineralogically, more than 15% kaolinite and (iii) finely divided silica. The silica is preferably included in the form of silicic acid. In this patent application, the kaolinite clay is used as filler/stabilizer. The total amount of fine filler material is limited to a maximum of 10% by weight.

At present it is not known how to manufacture aqueous silicate suspensions including relatively high amounts of fine filler materials, yet maintaining a sufficient storage stability in the absence of a stabilizer.

The present invention now provides a suspension having high storage stability, comprising an aqueous silicate solution and a filler material, wherein the silicate solution has a silicate content of at least 20% by weight, the filler material has an average particle size of 0.8–15 μm and a specific weight of below 2.75 kg/l, the filler being chosen from the group consisting of a) zeolites, b) fine particulate or fibrous amorphous inorganic material being relatively inert in an alkaline aqueous solution, comprising amorphous alkali metal alumino silicate c) fine particulate of graphite or carbon black, or d) mixtures thereof, said suspension having a high storage stability in the absence of a stabilizer. It is deemed surprising that the suspensions according to the invention have excellent storage stability in the absence of a stabilizer. Usually no settling of the fine filler material will take place within five days in a liquid column with a height of 24 cm. Preferably the specific weight of the filler material is below 2,5 kg/l.

It is noted that with the suspension according to the invention the use of stabilizers is by no means excluded, as it may sometimes for specific applications be advantageous to add a stabilizer e.g. to improve the stability of the suspension even further.

In the prior art aqueous silicate solutions are used for many applications where filling or binding properties are required. For instance leaking sewer pipes can be repaired in the ground by pumping a concentrated aqueous silicate solution into the leaking sewer system. Said silicate solution leaks out of this system filling up the space in the ground around the leaking locations. After some time the silicate in the sewer system is replaced by a hardener which also leaks into the leaking locations and the surrounding ground neutralizing the silicate and thus sealing the leaks. The silicate and the hardener thus fill up the space between the ground particles around the leaks.

Usually hardeners in the form of relatively expensive esters of organic acids are used, which hydrolyse and thereby release an acid which is needed for neutralization of the silicate.

It is of environmental and economic importance to minimize the amount of ester (and consequently of the silicate, needing neutralization) required.

The presence of the filler material in the suspension according to the invention has the advantage that for instance in the application of sewer system repair, this filler material may partially fill up the spaces between the ground particles, which reduces the amount of silicate needed and consequently also reduces the amount of ester needed. Moreover some of the pores in the ground will be blocked by the filler which reduces the penetration of silicate and ester into the ground, thus further reducing the amount of silicate and ester required. Also the solids content of the suspension is increased, thereby further increasing the density and the strength of the material filling up the pores in the ground and consequently further reducing the permeability of the layer around the leaking locations of the sewer system.

Usually in silicate liquors which are used for sewage system repair the $SiO_2$ content is limited to maximum about 33% by weight, which of course limits the amount of silica in silicagel (Dry Solids content), which can be formed by addition of the hardener. This limited solids content has a major influence on the physical and mechanical properties of the gel which can be obtained, limiting the density, strength and also limiting the attainable minimum for the permeability of the bound material, like sand, ground or soil. Also the hydrolysis of the ester into the acid can be relatively slow and uncontrolled.

As filler in the suspension according to the present invention advantageous zeolites are used. Zeolites are crystalline aluminosilicates.

Most zeolites are well known relatively inert environmentally harmless substances. Examples of zeolites, that are available or can be produced in fine particulate form are zeolites 4A, zeolite P, zeolite X and zeolite Y. Zeolite P is preferred, because of its layered structure, being non abrasive and relatively soft, also implicating less wear in machinery.

A suspension according to the present invention comprising synthetically produced zeolite P can be made, having the additional advantage of not containing carcinogenic crystalline silica (quartz, cristobalite) as can be the case when inorganic mineral fillers are applied. These crystalline silicas are declared to be carcinogenic, and it is to be expected, that the use thereof will be prohibited or restricted globally.

It is preferred to use zeolite P, prepared according to the method described in EP-B-0 384 070, having a silicon to aluminium ratio of not higher than 1,33, and a calcium binding capacity as defined in EP-B-0 384 070 of at least 150 mg CaO per g anhydrous aluminosilicate.

The filler material may advantageously comprise a fine particulate or fibrous amorphous inorganic material, being relatively inert in an alkaline aqueous solution, comprising an amorphous alkali metal-aluminosilicate. Most amorphous products tend to be too reactive in the alkaline silicate environment. The exception is found to be amorphous sodium aluminosilicate, produced by precipitation from a highly alkaline aluminate solution and a highly alkaline silicate solution.

A preferred example of such amorphous filler material is of synthetic origin, as in natural alkali metal aluminosilicates, trace amounts of crystalline silica may again be present, implicating a restricted future use thereof as is outlined above. Synthetic alkali metal aluminosilicate is free of crystalline silica when produced from purified liquid raw materials (silicate and aluminate).

The filler may be a mixture of the above mentioned zeolites, fibrous or particulate amorphous inorganic material, graphite or carbon black.

The inorganic filler material used in the suspension according to the invention preferably comprises a zeolite.

The maximum particle size of the filler material is of course depending on the specific weight of filler material, the shape of the filler material and the specific weight of the silicate liquor, the molar ratio ($SiO_2/M_2O$) and the concentration of the alkali metal silicate in the silicate solution in order to provide a suspension having the required storage stability.

For highly porous particles with a very open structure as for example amorphous sodium-aluminosilicate the average particle size can be as high as 14.83 micrometers still providing a suspension with reasonable stability. However, advantageously the average particle size of the filler material is comprised between 0.8–10 $\mu$m, preferably between 0.8–5 $\mu$m, more preferably between 0.8–4 $\mu$m, and most preferably between 0.8–2 $\mu$m.

The content of the filler material will have its physical limitations in the suspension. Preferably the content of the filler material in the suspension is such, that the suspension is pourable or pumpable, which is a requirement for specific applications. For other applications (e.g.: for adhesion of paper, wood, concrete or bricks) more concentrated suspensions with a higher viscosity will be required. Preferably the content of the filler material is comprised between 2–50% by weight, more preferably between 10–40% by weight, and even more preferably between 10–30% by weight.

In the suspension according to the invention the aqueous silicate solution is not specifically limited and can be selected from known silicate solutions depending on the specific application requirements. Usually the silicate solution is an alkali metal silicate solution, i.e. Na-, K-, or Li-silicate solutions or an ammonium silicate solution or mixtures thereof.

In the present specification the $SiO_2/M_2O$ molar ratio of the silicate will be used as a measure to identify the specific silicate solution, wherein M designates the specific alkali metal or ammonium (Na, K, Li, $NH_4$).

The $SiO_2/M_2O$ molar ratio of these soluble silicates can vary from 1.0 to around 4.0 and for lithium silicate even higher. All silicate solutions are alkaline, but the alkalinity decreases with increasing molar ratio. Consequently silicate solutions with higher molar ratios are safer in handling, which is demonstrated by the following safety classification of the standard silicate solutions as offered on the market.

| Molar Ratio $SiO/M_2O$: | Solutions offered on the market as: | Classification in Europe (Safety): |
|---|---|---|
| 1.0 | Metasilicate | Corrosive |
| 2.0 | "Alkaline" Silicate (or: "Alkaline waterglass") | Highly Irritant |
| 3.3 | "Neutral" Silicate (or: "Neutral waterglass") | Not classified as unsafe |

The preferred $SiO_2/M_2O$ ratio for most applications is therefore above 2.6 and more preferably 3.3 and higher for safety reasons. For these applications requiring hardening it is also preferred to maximize the $SiO_2$ content and consequently also the $SiO_2/M_2O$ ratio to minimize the amount of hardener required for neutralization. It was surprisingly also found, that a higher molar ratio is also more suitable to produce stable suspensions.

The properties of the suspension are highly influenced by the $SiO_2/M_2O$ molar ratio. Therefore advantageously the $SiO_2/M_2O$ molar ratio of the aqueous silicate solution is comprised between 1–4.5, preferably between 2–4.2 and most preferably between 2.6–4.2.

The silicate content of the aqueous silicate solution used in the suspension according to the invention is at least 20% by weight and in particular at least 25% by weight. Preferably the silicate content is as high as possible.

The invention further provides an adhesive composition comprising a suspension according to the invention. Such adhesive compositions can be used for all kinds of adhesion purposes e.g. paper, wood, concrete, bricks, floor tiles, rubber, leather (e.g. shoes), glass, metal (e.g. aluminium foil), plywood, plasterboard and woodchip manufacture etc. Especially materials with irregular surfaces which are usually difficult to adhere, like filter paper, wood or concrete can be adhered to each other or other surfaces by use of such an adhesive. The adhesive is particularly suitable for bonding of perlite, vermiculite, glass fibre, mineral fibre, rockwool, for e.g. thermal or acoustic insulation in blankets, panels, boards, shapes, inserts, spray-on coatings and the like. The suspension according to the invention causes a very fast tack and dries relatively quickly gives a flexible bond and significantly reduces dusting.

Advantages of the use of suspensions according to the invention in adhesive compositions are a.o.: —There are no organic compounds (incl. volatile solvents) used. —There is no necessity to clean or dry the surfaces before using the silicate suspension as filler or adhesive and the (inorganic) adhesive or filler reduces the flammability of the materials used.

Because of the absence of the organic compound materials, which themselves are safe and are bonded by adhesives according to the invention (e.g. paper, cardboard, wood, sand, soil, etc.) may be safely disposed of by landfill.

The $SiO_2/M_2O$ molar ratio of the aqueous silicate solution of the adhesive according to the present invention, M being alkali metal or ammonium, is preferably comprised between 2.8 and 4.2. Higher molar ratio mostly leads to viscous products. These viscous products can however still be used as adhesives and may be, if required, diluted in order to reduce the viscosity. The average particle size is preferably below 3 μm.

A preferred example of a suspension according to the invention which is suitable as an adhesive is a suspension of zeolite Zeocros CG180 of Crosfield (Eijsden, The Netherlands) in a 10% to 30% % by weight suspension thereof in neutral silicate containing around 35% by weight of silicate with a molar ratio of about 3.3, the average particle size of the Zeocros CG180 being about 1 μm. If a small amount of such a suspension is spread over a part of a surface of a paper sheet and then covered with another paper sheet, it was found, that an immediate strong tack was obtained and that drying took place under normal conditions at approximately 20° C. within a few minutes. Strong binding between the bound paper parts was realized for filter paper as well as for standard paper and the paper parts could not be separated without tearing. By use of the adhesive according to the invention a reduced flammability of the bound paper parts is obtained, no organic compounds are used and a better binding is obtained.

With adhesives, according to the invention laminated paper, like spirally wound laminated paper tubes, cardboard, corrugated cardboard, wall-paper, laminated wood, plywood, leather, e.g. shoe soles and building materials can be manufactured. It was observed that for the adhesion of bricks and shoe soles, the use of suspensions of zeolite Zeocros CG180 with higher zeolite contents (e.g. 27%) were giving stronger binding and are therefore preferred. The adhesive can also be used to bind powders or other particulate or fibrous materials to form larger agglomerates, e.g. for the production of structural building components, like bricks, roof tiles etc. Also it can be used for the preparation of paper-mache for manufacturing paper articles.

Adhesives according to the invention can also be used to bind stones, bricks or concrete building materials for the construction of walls, houses and also for repairing shoes and shoe soles, by adhesion of leather components.

It was found, that for these applications as adhesive, addition of a surfactant or a hardener was not necessary as long as there is sufficient porosity in the material bound together to allow penetration of the adhesive and to allow the suspension to dry. However in case evaporation of the water present in the suspension is too slow or if better water resistance is required, a hardener and/or a surfactant can be added. As surfactants, cationic surfactants like cetyltetra ammoniumchloride may be preferred.

The invention further provides a drilling fluid comprising a suspension according to the invention. In oil well drilling, suspensions of various solids in an aqueous system are cycled through the bore hole, which suspensions are called drilling fluid or drilling mud. The main functions of said fluid is cooling of the drill head and removal of the cuttings.

The purpose of said solids used in a drilling fluid is to increase the density of the drilling fluid and to penetrate the pores in the ground around the bore hole to block these pores and to minimize losses of drilling fluid into the surrounding formation. In practice these solids have presented problems, as they may tend to settle, which can occur during interruption of the drilling operation e.g. during connection of a new length of drilling pipe etc. In the field of drilling silicate is already used to increase the density of the drilling fluid and to assist in the removal of the cuttings.

A high density of the drilling fluid is necessary to avoid so called "blow outs" in case a layer is reached in the formation having a high pressure.

The use of the suspension according to the invention as a drilling fluid will however have a number of additional advantages. Easy and safe dosing of particles, already in suspended form (no dust) is obtained, which is safe for health and environment (the fluid does not contain any crystalline silicas nor any other toxic or environmentally unsafe component). The suspended particles can be selected easily so as to have the right size for blocking the pores in the ground. Two essential components for drilling can be simultaneously dosed in one liquid. As the average particle size can be adjusted easily, the risk of settling of particles in the drilling fluid is substantially eliminated.

Due to environmental reasons, drilling fluids which contained high levels of organic compounds in the past for various reasons are now being replaced by "Aqueous Drilling Fluids", being free or practically free of organic compounds. A problem related to this change is lubrication of the bore head, which was realized in the past by the addition of organic lubricants, which are not acceptable nowadays.

The use of a stable suspension containing graphite or carbon black provides a good solution to the lubrication problem, connected to the use of "Aqueous Drilling Fluids", where it is not practical to mix in fine dusty powder of graphite or carbon black in a drilling fluid on a windy outside or off-shore rigs.

The invention further provides a sewer renovation fluid comprising a suspension according to the invention. As discussed earlier the suspension according to the invention can be used in a sewer renovation fluid which provides the following advantageous properties. The solid content in the silicate suspension used is much higher than in the previous known suspensions whereby the filling of the space between soil particles in the ground is improved, leading to a denser and stronger sealing layer around the leaking location and a longer additional life for the repaired sewer part. Further less permeability of the layer around the repaired sewer part is obtained which further minimizes leakage of fluid from the sewer system to the environment or of ground water into the sewer system. A better efficiency and less leakage of the suspension used for repair into the ground is obtained. This can be a very important advantage as in highly porous ground these losses are substantial.

Finally an additional protection of the environment is obtained in case Zeocros CG180 is used, which has binding properties for several heavy metals, mineral oxides and mineral fines. Consequently in case the permeability for sewer fluid would not be 100% perfect and if very small quantities would still leak through, heavy metals could be captured by said zeolite Zeocros CG180 further preventing these from reaching the environment.

The same principle as applied in the sewer renovation system can also be applied in other systems, where leaks or cracks have to be repaired, e.g. in concrete floors, which can be important in case of (chemical-) factory floors and also in concrete tanks, protecting tanks which contain chemicals and which are placed inside the concrete tank. The system could even be applied in road repairs. where the holes or cracks can be filled up with the suspension together with the hardener. In case of larger holes, a filler material could be added, e.g. sand.

The invention also provides a binder composition comprising a suspension according to the invention. Binder applications are numerous and will of course not all be cited here. The suspension according to the invention can be used for binding particles in agglomeration and the like. The advantageous binder properties can be used in for instance sprayed concrete, the production of roof tiles or other structural building components, in foundries (sand+a binder system), in grouting, production of solid (building–or construction) blocks from various solids and silicate as a binder. In this application, solid wastes in powder form, e.g. powders from waste incineration and various fly-ashes can be used in various building applications.

The suspension according to the invention improves the density, hardness and impermeability of the manufactured products. In case of incinerated waste and fly ashes, it will also contribute to the reduced leaching out of heavy metals contained in these materials. It can also be used to bind dusty compound, e.g. mineral fines, asbestos.

Further a waste fixation composition is provided comprising a suspension according to the invention. For waste fixation several techniques are developed. An impermeable wall and an impermeable floor can be formed around the waste dump, where the waste is stored. This wall and floor usually consist of a plastic layer and/or a solidified layer, e.g. concrete.

According to the invention said wall and floor comprise a layer containing solids and silicate which is hardened by neutralisation and gelling.

By using the suspension according to the invention as a waste fixation material the following benefits are obtained.

Due to the increased solids content a harder and denser, and consequently less permeable layer will be obtained with better encapsulating properties and a potentially longer lifetime of the encapsulated material. Leaching out will substantially be eliminated by use of the suspension according to the invention.

As specified earlier the use of a zeolite of the P-type, e.g. zeolite Zeocros CG 180 will provide the additional benefit that it binds many heavy metals and also amines and ammonium ions in case there would still be some leakage.

Further a fixation and hardening composition is provided for ground surfaces (e.g.: of sand, soil or clay), comprising a suspension according to the invention. Surface fixation or hardening is applied for (country-) road preparations or to produce a harder foundation e.g for constructions etc. and is also of interest for the fixation of pure sand surfaces, e.g. dunes and deserts, which are spread or moved by the wind. According to the invention surfaces can be fixed and hardened by impregnating these surfaces (e.g. by spraying on) with a suspension according to the invention. Hardening could be realized by neutralisation by means of the carbon-dioxide in the air followed by gelation. However this is a slow process and alternatively a hardener can be applied, preferably based on amorphous Silica.

Further an alternative for a concrete cement composition is provided for construction works comprising a suspension according to the invention. In this application a suspension according to the invention can be mixed with a hardener (preferably Silica or an amorphous metalsilicate). In a preferred procedure for this application additional solid compounds are mixed in as well (e.g.: sand) in order to increase the strength of the hard solid obtained after hardening and to reduce costs.

The invention also provides a spray-coating composition comprising a suspension according to the invention. Spray coatings are coatings as e.g. described in GB-A-2 058 818.

A paper filler composition comprising a suspension according to the invention is provided. It was found that especially zeolites of the P-type with small particles (around 1 $\mu$m) as provided by Zeocros CG180, tested in the paper industry as a potential filler, showed optimum characteristics with respect to opacity and printing properties achieved, matching the best products in the market. The paper industry however requires zeolite Zeocros CG180 to be provided in suspended form and not in powder form.

Therefore the suspension according to the invention is very suitable for that purpose.

The present invention also relates to the use of an adhesive composition comprising a suspension according to the invention for the manufacture of cellulose containing materials, like paper articles, e.g. papier-mâché, laminated paper, such as cardboard, spirally or convolute (parallel) wound laminated paper tubes and drums and the like. For example, the adhesive can be used in a method for manufacturing tubes comprising two or more layers of cardboard and/or paper, wherein an adhesive is applied on at least one of the surfaces of the said layers, the layers being spirally or convolutely wound over each other, wherein an adhesive according to the present invention is applied on the said surface(s). By using the adhesive in the method for manufacturing said tubes and drums, an improved hardness and better crush strength and lower moisture content in the final tubes and drums can be obtained compared to organic adhesives used in practice (e.g.: dextrin or polyvinylacetate (PVA). Surprisingly, the production speed can be increased compared to adhesives used in the state of the art. Furthermore the same adhesive can be used to adhere the outer layer of the tubes, normally a thin paper layer, to the other layers, normally freshly made of cardboard. In the state of the art, different adhesives have to be used to adhere said thin paper layer to the outer cardboard layer on the one hand and to adhere the cardboard layers with each other on the other hand.

Paper material being coated with the adhesive according to the present invention has fire retardant properties. This is a remarkable and important feature, as paper/cardboard products made using the adhesive according to the present invention can be used at high temperatures and are safe in use and during storage. In laminated paper articles the adhesive according to the present invention may be formed as a layer between the paper layers, so that each paper layer therein has said fire retardant properties.

The suspension according to the present invention can advantageously be used as fireproof coating on all kinds of substrates which are e.g. like discussed above.

In particular the present invention also relates to the use of an adhesive composition comprising a suspension according to the invention as a binder for rockwool or glass fibre.

It will be clear that the above cited applications are not meant to be an exhaustive enumeration and that many other applications are feasible.

Advantageously the suspensions according to the invention can be hardened by using a hardener. Preferably said hardener comprises an amorphous silica, or alternatively an amorphous metal silicate, like aluminium silicate, magnesium silicate or calcium silicate.

In a preferred embodiment of the application of the suspensions according to the invention a hardener system is used based on amorphous silica.

It has surprisingly been found, that amorphous silica ($SiO_2$) offers an excellent inorganic hardener, which can be used beneficially in combination with silicate based suspensions, according to the invention.

Amorphous silica is synthetically produced and is offered on the market by several companies, e.g. by Crosfield in Warrington (UK) under the Brandnames Gasil, Lucilite, Microsil etc. Synthetic amorphous silicas are produced by neutralisation of a silicate solution, filtering-off and washing of the Silica produced and subsequent drying.

The solubility (rate of dissolution) of the amorphous silica, obtained according to this production process, in an alkaline solution depends on the precipitation conditions and the drying conditions applied in the production process of the amorphous silica and also on the dissolution temperature and of the alkalinity of the solution used and can be varied accordingly.

It was now surprisingly found, that adding finely divided amorphous silica does not produce a stable suspension at all. On the contrary, silica in amorphous form slowly dissolves in the silicate, thus acting as an acid, neutralizing the silicate and consequently forming a gel. This is the case when sufficient amorphous silica is mixed in pure silicate liquors, giving a gel, but also when sufficient amorphous silica is mixed in suspensions according to the invention. Gels obtained when mixing amorphous silica in suspensions according to the invention provided superior density, hardness and minimum permeability.

Consequently it was found, that amorphous silica forms an ideal hardener, being again completely inorganic and completely safe with respect to safety and the environment. It also further reduces the flammability and increases the solid content after hardening. An additional benefit being, that the hardened suspension, using sufficient amorphous silica forms a neutralised solid phase with superior adhesion and filling properties, which is very strong and practically insoluble in water.

It was found, that the rate of hardening of the suspensions of zeolite in a silicate liquor, e.g. the suspension according to the invention, using amorphous silica can be influenced by the choice of amorphous silica and by the amount of amorphous silica used. The use of silicas with a higher rate of dissolution in alkaline aqueous solutions increases the hardening rate.

It is therefore possible to control the hardening (setting) rate by choosing the type of silica, the optimal concentration and the temperature, as can be carried out by a person skilled in the art. The hardener system should be mixed in the suspension shortly before use.

The use of silica as a hardener has several benefits, it further increases the solid content leading to a denser, stronger and less permeable phase. It is safe for human health and the environment and it also implies, that no organic components are required.

As a hardener, also an amorphous metal silicate can be used. Such a compound results in a spacial configuration change of the silicate in the suspension by alteration of the molar $SiO_2/M_2O$ ratio thereof. Suitable metal silicates are those which do not readily dissolve in the silicate containing suspension to be hardened, like e.g. magnesium silicate, calcium silicate or aluminium silicate.

It was found, that graphite or carbon black, which are well known environmentally acceptable lubricants can be also suspended in aqueous liquors of silicate, forming stable suspensions preferably the content of the graphite particles is comprised between 1–50% by weight, preferably between 5–35% by weight.

Stable suspensions were further obtained when fine particles of zeolite and of graphite were together suspended in aqueous silicate liquors. In particular the filler material comprises a mixture of fine particles of zeolite of the P-type and of graphite or carbon black, more preferably the particulate filling material comprises a mixture of a zeolite of the P-type marketed by Crosfield under the brand name Zeocros CG 180 and graphite or carbon black.

Further a drilling fluid is provided comprising such a suspension.

In the following a number of examples are provided to illustrate the present invention. These examples are not intended to limit the invention as defined in the enclosed claims. All percentages are percentages by weight unless specifically tipulated otherwise.

EXAMPLES

| | Materials used | |
|---|---|---|
| A. | Commercial name | Crystal 0070 (Crosfield Eijsden (NL) |
| | Product | Neutral sodium-silicate liquor |
| | Dry solid content | 35.06% |
| | $SiO_2$ content | 26.81% |
| | $Na_2O$ content | 8.25% |
| | Density (20° C.) | 1355 g/l |
| | Viscosity | 51 cP |
| B. | Product | Alkaline sodium-silicate liquor |
| | Dry solid content | 45 |
| | $SiO_2$ content | 29.67% |
| | $Na_2O$ content | 15.33% |
| | Density (20° C.) | 1456 g/l |
| | Viscosity | 90 Cp |
| C. | P-type zeolite in dry powder form | |
| | Commercial name | Zeocros CG180 (Crosfield Eijsden) |
| | Dry solid content *) | 90% |
| | Particle size **) | 0.7–3 micrometer |
| | Average particle size **) | 0.92 micrometer |
| | D50 | 1.22 micrometer |
| | Effective density ***) | 2480 g/l. |
| D. | Wet P-type zeolite (Filter cake) | |
| | Dry solid content *) | 41.3% |
| | Average particle size **) | 3.18 micrometer |
| | D50 | 3.22 micrometer |
| E. | 4A Zeolite in dry powder form from Crosfield, Eijsden | |
| | Commercial name | Zeocros CG150 |
| | Dry solid content *) | 80% |
| | Average particle size **) | 2.75 micrometer |
| | $D_{50}$ | 2.79 micrometer |
| | Effective density ***) | 2070 g/l. |
| F. | Magnesium-silicate in dry powder form | |
| | Product | Macrosorb M15 (Crosfield Eijsden) |
| | Average particle size *) | 7.44 micrometer |
| | $D_{50}$ | 3.95 micrometer |
| G. | Amorphous Sodium-aluminosilicate in powder form | |
| | Prepared by precipitation from a sodiumaluminate and a sodiumsilicate solution at a temperature below 60° C., washing and drying. | |
| | Sample code | CENAS 019 F |
| | Dry Solid content | 73.3% |
| | Average particle size | 14.83 micrometer |
| | $D_{50}$ | 12.33 micrometer. |
| H. | ALUSIL ET, a commercially available, synthetic Aluminium-silicate, marketed and produced by Crosfield, Warrington UK. | |
| | Dry Solid content | 90 wt. %. |
| | Average Particle size | maximum 10.3 micrometer, using a Mastersizer. |
| I. | Talcum powder. | |
| | A commercially available product. | |
| | Dry Solid content | >93.5% (heating at 1000° C.) |

-continued

Materials used

J. Graphite in powder form.

A commercially available product.
Dry solids content        99.5% (heating at 120° C.)
Particle size             99.5% by weight below 50 micrometer.

K. Microcal ET.

A commercially available, synthetically produced Calcium-
silicate, marketed and produced by Crosfield, Warrington,
UK.
Dry Solid content         90%
Average Particle size     maximum 10.3 micrometer measured
                          by Mastersizer.

L. Lucilite.

A commercially available, synthetically produced amorphous
Silica (hydrogel), marketed and produced by Crosfield,
Warrington, UK.
Dry Solid content *)      34.78%

M. Gasil HP 250

A commercially available amorphous Silica, synthetically
produced and marketed by Crosfield, Warrington, UK.
Dry Solid content *)      93.49%
Average Particle size     4.8–6.2 micrometer (Mastersizer)

N. Microsil ED

A commercially available amorphous Silica, synthetically
produced and marketed by Crosfield, Warrington, UK.
Dry Solid content *)      89.37%

O. Potassium-silicate solution K53.

A commercially available aqueous solution of Potassium-
Silicate, marketed and produced by Crosfield, Warrington,
UK. Properties:
Dry Solid content *)      32.25%
Molar Ratio: SiO$_2$/K$_2$O   3.9

P. Potassium-silicate solution K120.

A commercially available aqueous solution of Potassium-
silicate, marketed and produced by Crosfield, Warrington,
UK. Properties:
Dry Solid content *)      53.26%
Molar Ratio: SiO$_2$/K$_2$O   2.2

Q. Stabifix Super

A commercially available amorphous Silica, synthetically
produced and marketed by Crosfield, Warrington UK.
Dry Solid content *)      94.6%
Average Particle size     10.3 maximum micrometer (Mastersizer)

*) Measured by heating at 800° C. during 30 minutes
**) Measured by the sedimentation technique using Sedigraph type 5100, marketed by Micromeritics
***) Measured by immersion in water.

Example 1
Preparation of a Suspension of 9% of a P-type Zeolite With an Average Particle Size of 0.92 Micrometer in a Neutral Silicate Liquor 450 g of a neutral silicate liquor (A) was introduced into a beakerglass of 600 ml.

Under intensive stirring, 50 g of the P-type zeolite powder (C) was added in approximately 5 min. Stirring was continued until the zeolite powder was completely suspended (approximately 5 min).

The suspension had the following characteristics:

| | |
|---|---|
| Zeolite content (as bone dry zeolite) | 9.0% |
| SiO$_2$ content (in aqueous phase) *) | 24.13% |
| Na$_2$O content (in aqueous phase) *) | 7.42% |

-continued

| | |
|---|---|
| Silicate content (bone dry) | 31.55% |
| Total Dry Solid Content | 40.55% |
| Total H$_2$O content | 59.45% |
| Density (20° C.) | 1420 g/l |
| Viscosity **) | |

| D s$^{-1}$ | Cp |
|---|---|
| 99 | 117 |
| 152 | 99 |
| 233 | 95 |
| 358 | 88 |

Notes:
*) In all examples, the SiO$_2$ and the Na$_2$O contents quoted in the suspension only comprise the SiO$_2$ and the Na$_2$O in solution and do not include the SiO$_2$ nor the Na$_2$O present in the added solid (e.g.: in the zeolite)
**) The (Dynamic-) viscosity is measured in a commercially available equipment: CONTRAVES RHEOMAT 108

A portion of this suspension was transferred in a 500 ml glass cylinder (height: 240 mm) and stored as such.

The storage stability was assessed visually, assessing whether there was any noticeable phase separation in the top layer and whether any denser layer could be observed near the bottom. Possible sedimentation on the bottom was also assessed by introducing a rod with a flat widened surface on one side which was carefully lowered in the cylinder to the bottom.

| | Example 2 | Example 3 |
|---|---|---|
| Silicate liquor (g) | 400 | 350 |
| P-type zeolite powder (g) | 100 | 150 |

This suspension is considered to be stable.

Example 2 and 3
Preparation of Suspensions of 18% and 27% of a P-type Zeolite With an Average Particle Size of 0.92 Micrometer in a Neutral Silicate Liquor The same procedure, using the same zeolite powder and the same silicate liquor was applied for Examples 2 and 3 as in Example 1 and using the following quantities:

| Results: Storage time (days) | Phase separation in top layer | Sediment at cylinder bottom |
|---|---|---|
| 1 | 0 *) | 0 |
| 2 | 0 | 0 |
| 5 | negligible **) | negligible **) |

Notes:
*) 0 means that absolutely no trace of phase separation or sedimentation could be observed.
**) Negligible means that only a trace (<<1%) of phase separation or sedimentation could be observed.

The suspensions obtained had the following characteristics:

| | Example 2 | Example 3 |
|---|---|---|
| Zeolite content (bone-dry zeolite) (%) | 18.0 | 27.0 |
| SiO$_2$ content (in aqueous phase) (%) | 21.45 | 18.77 |
| Na$_2$O content (in aqueous phase) (%) | 6.6 | 5.77 |

-continued

|  | Example 2 | Example 3 |
|---|---|---|
| Silicate content (bone dry) (%) | 28.05 | 24.54 |
| Total Dry Solid content (%) | 46.05 | 51.54 |
| Total H$_2$O content (%) | 53.95 | 48.46 |
| Density (20° C.) (g/l) | 1470 | 1550 |
| Viscosity: | | |

| Cp at D s$^{-1}$ | | |
|---|---|---|
| 17.7 | | 3470 |
| 27.2 | | 2480 |
| 41.7 | | 1790 |
| 64 | 366 | 1331 |
| 99 | 297 | 973 |
| 150 | 254 | 730 |
| 232 | 217 | 594 |
| 358 | 186 | |

Example 2 Example 3

Stability of the Suspensions

The stabilities of the suspensions were assessed as in Example 1 in a 250 ml glass cylinder of the same shape and dimensions.

Results

| Storage | Example 2 | | Example 3 | |
|---|---|---|---|---|
| Time (days) | Phase separation in top layer | Sediments on cylinder bottom | Phase separ. top layer | Sediments on cylinder bottom |
| 1 | 0 | 0 | 0 | 0 |
| 2 | 0 | 0 | 0 | 0 |
| 5 | 0 | negligible | negligible | 0 |
| 20 | 0 | negligible | negligible | 0 |

Also these suspensions have an excellent stability. From this result it was concluded, that 5 days storage is sufficient for the assessment of the stablity of a suspension.

Example 4

Preparation of a Suspension of 14.6% of a P-type Zeolite With an Average Particle Size of 3.18 Micrometer in a Neutral Silicate Liquor The same procedure was followed as used in Example 1, using the same size beakerglass for the preparation and the same glass cylinder size for assessment of the stability of the suspension. The experiment was carried out twice as a result of the erratic results in the stability test.

| Starting materials were: | |
|---|---|
| Neutral silicate liquor (material A) | 400 g |
| Zeolite filter cake (material D) | 218 g |
| Suspension obtained: | |
| Zeolite content (bone dry) | 14.6% |
| SiO$_2$ Content (in aqueous phase) | 17.35% |
| Na$_2$O Content (in aqueous phase) | 5.34% |
| Silicate content (bone dry) | 22.69% |
| Total Dry Solid content | 37.29% |

-continued

| Total H$_2$O content | 62.71% |
|---|---|
| Density (20° C.) | 1370 g/l |
| Viscosity: | |

| D s$^{-1}$ | Cp |
|---|---|
| 358 | 19 |

| Stability Days | Sediment on bottom | | Phase separation top layer | |
|---|---|---|---|---|
| | | (repeat) | | (repeat) |
| 1 | 0 | 0 | 0 ml | 8 ml |
| 4 | 0 | 0 | 0 ml | 100 ml |
| 5 | 0 | 0 | 105 ml | 110 ml |

The suspension is not stable but borderline, showing reasonable stability during 1 day. There is no settling on the bottom and reslurrying needs minimal stirring or shaking. This is possibly an acceptable stability for some applications where the time interval between slurry production and use is relatively short.

Example 5

Preparation of a Suspension of 14.6% of a P-type Zeolite With an Average Particle Size of 0.92 Micrometer in a Neutral Silicate Liquor The same procedure was followed as used in Example 1, using the same size beakerglass for the preparation and the same glass cylinder size for assessment of the stability of the suspension.

In this EXAMPLE 5, a suspension was produced with exactly the same composition as in EXAMPLE 4. For this purpose 100 g of the zeolite of the P-type (material C) was used after addition of 218 g of demineralized water to bring it to exactly the same Dry Solid content as Material D, which was used in EXAMPLE 4.

Also 400 g of neutral silicate (material A) was used. Composition and Characteristics of the suspension: The same as in EXAMPLE 4. The only difference with EXAMPLE 4 being the particle size of the P-Type zeolite.

| Stability: Days | Sediment on bottom | Phase separation top layer |
|---|---|---|
| 1 | 0 | negligible |
| 2 | 0 | negligible |
| 5 | 0 | negligible |

This suspension is stable, which demonstrates the influence of particle size.

Example 6

Preparation of a Suspension of 16% 4A Zeolite With an Average Particle Size of 2.75 Micrometers in a Neutral Silicate Liquor The same procedure as before was used with materials A (400 g) and E (100 g).

| Composition characteristics: | |
|---|---|
| Zeolite content (bone dry) | 16.0% |
| SiO$_2$ Content (in aqueous phase) | 21.45% |
| Na$_2$O Content (in aqueous phase) | 6.6% |
| Silicate content (bone dry) | 28.05% |
| Total H$_2$O | 55.95% |
| Density (20° C.) | 1448 g/ml |
| Viscosity: | |

-continued

| D s$^{-1}$ | Cp |
|---|---|
| 64.6 | 165 |
| 99 | 144 |
| 152 | 125 |
| 233 | 118 |

| Stability: Days | Sediments on bottom | Phase separation in surface |
|---|---|---|
| 1 | 0 | 30 ml |
| 2 | 0 | 40 ml |
| 5 | 0 | 50 ml |

Examples 7 and 8
Suspensions of P-type Zeolite in Alkaline Silicate Liquor

The same procedure as earlier was used with the following materials and quantities:

| | Liquor | | Zeolite | |
|---|---|---|---|---|
| Example Nr. | Silicate material | weight (g) | material | weight (g) | content (wt. % bone dry) |
| 6 | B | 400 | C | 100 | 18.0 |
| 7 | B | 400 | D | 218 | 14.6 |

Examples 9 and 10
Suspensions of P-type Zeolite in Diluted Alkaline Silicate Liquor The following materials were used and the same procedure as in previous Examples. The silicate (material B) was diluted with water (2:1) before use to a dry solid content of 30%. The following quantities were used:

| | Diluted Silicate | Zeolite | | |
|---|---|---|---|---|
| Example Nr. | Weight (g) | Material | weight (g) | content (wt. % bone dry) |
| 8 | 400 | C | 100 | 18.0 |
| 9 | 400 | D | 218 | 14.6 |

Composition characteristics of suspensions 7–10:

| Example Nr | 7 | 8 | 9 | 10 |
|---|---|---|---|---|
| Average part. size ($\mu$m) (of zeolite) | 0.92 | 3.18 | 0.92 | 3.18 |
| Zeolite Content (wt. %) (bone dry) | 18.00 | 14.6 | 18.0 | 14.6 |
| SiO$_2$ content (wt. %) (in aqueous phase) | 23.74 | 19.2 | 15.82 | 12.8 |
| Na$_2$O content (wt. %) | 12.26 | 9.9 | 8.18 | 6.6 |
| Silicate Dry solids content (wt. %) | 36.00 | 29.1 | 24.0 | 19.4 |
| Total Solids (wt. %) | 54.00 | 43.7 | 42.0 | 34.0 |
| Total H$_2$O (wt. %) | 46.00 | 56.3 | 58 | 66 |
| Density (g/l) | 1670 | 1488 | 1452 | 1346 |
| Viscosities (Cp) of the suspensions: | | | | |
| Viscosity at: D s$^{-1}$ 17.7 | 27.2 | 41.7 | 64 | 233 | 358 |

-continued

| Example Nr. | | | | |
|---|---|---|---|---|
| 7 | 1840 | 1800 | 1790 | 1770 |
| 8 | | | | 48 |
| 9 | | | | 28 |
| 10 *) | | | | |

Stabilities of the suspensions:

| Example | Sediments | | | | Phase separation | | | |
|---|---|---|---|---|---|---|---|---|
| Days | 7 | 8 | 9 | 10 | 7 | 8 | 9 | 10 |
| 1 | 0 | 0 | 0 | 0 | 0 | negl. | 4 ml | 36 ml |
| 4 | 0 | 0 | 0 | 0 | 0 | negl. | 22 ml | 148 ml |
| 5 | 0 | 0 | 0 | 0 | 0 | negl. | 22 ml | 152 ml |

*) The viscosity of EXAMPLE 10 could not be measured, being less than 7 Cp

Example 7 and 8 have produced suspensions with good stability, while the sample tested in Experiment 9 has borderline stability and the sample in Experiment 10 is not acceptable.

These Examples show that the stability of the suspensions is strongly dependent on the concentration of the silicate liquor used. Higher silicate concentrations being preferred.

Examples 11–13
Suspensions of P-type Zeolite in Diluted Neutral Silicate Liquors These suspensions were produced according to the same procedure as before, using 400 g of silicate liquor (material A) with various degrees of dilution with water and 100 g of material C.

| Example Nr. | Dilution Material A | Water | Zeolite P Material |
|---|---|---|---|
| 11 | 2 | 1 | C |
| 12 | 1 | 1 | C |
| 13 | 1 | 2 | C |

Compositions of the suspensions 11–13

| Example Nr | 11 | 12 | 13 |
|---|---|---|---|
| Average part. size ($\mu$m) (of zeolite) | 0.92 | 0.92 | 0.92 |
| Zeolite Content (wt. %) (bone dry) | 18 | 18 | 18 |
| SiO$_2$ content (wt. %) (in aqueous) | 14.3 | 10.72 | 7.15 |
| Na$_2$O content (wt. %) | 4.4 | 3.3 | 2.2 |
| Silicate Dry solids content (wt. %) | 18.7 | 14.02 | 9.35 |
| Total Solids (wt. %) | 36.7 | 32.02 | 27.35 |
| Total H$_2$O (wt. %) | 63.3 | 67.98 | 72.65 |

Stability

| Example | Sediments | | | Phase separation (ml) | | |
|---|---|---|---|---|---|---|
| Days | 11 | 12 | 13 | 11 | 12 | 13 |
| 1 | 0 | 0 | 0 | 38 | 90 | ... |
| 4 | 0 | 0 | 0 | 80 | 104 | 122 |
| 5 | 0 | 0 | 0 | 65 | 108 | 125 |

Example 14
A Suspension of P-type Zeolite in a Concentrated Sodiumchloride Solution in Water Pure sodiumchloride was dissolved in demineralised water reaching a maximal sodiumchloride concentration in the liquor of 26.31 wt. %. The same procedure as in previous Examples was used, starting with 100 g P-type zeolite with an average particle size of 0.92 micrometers (material C) and 400 g of this concentrated sodiumchloride solution.

Composition of the slurry:

| | |
|---|---|
| Zeolite content (bone dry) (wt. %) | 18 |
| Sodiumchloride content (wt. %) | 21 |
| Total Solids content (wt. %) | 39 |
| H₂O content (wt. %) | 61 |
| Density (g/l) | 1290 |
| Viscosity | |
| D s⁻¹ | 233 |
| cP | 50 |

Stability

| Days | Sediment | Phase separation |
|---|---|---|
| 1 | 0 | 16 |
| 4 | 0 | 66 |
| 5 | 0 | 75 |

This suspension was not of a good stability. As the concentration of sodiumchloride is already high for an aqueous salt solution, it is concluded, that other salt solutions are not suitable either and that silicate has a unique position with respect to the stability of suspensions of small particles of inorganic crystalline material dispersed in it.

Example 15
Preparation of a Suspension of Magnesium-silicate With an Average Particle Size of 7.44 Micrometer in a Neutral Silicate Liquor The same procedure using 100 g of magnesiumsilicate (Material F) and 400 g of neutral silicate liquor (Material A) was applied as followed in the previous Examples to produce a suspension containing 15,6 wt. % of Magnesium-silicate (bone dry). Dry solid content 78%.

The suspension obtained was not stable at all. The amorphous magnesiumsilicate powder started to react with the silicate within hours. This caused the suspension to gel. From this it can be concluded, that amorphous Magnesium silicate can be also used as hardener for silicates and preferably for suspensions of crystalline aluminosilicates, e.g. zeolites in silicate liquors according to the invention.

Example 16
Preparation of a Suspension of Amorphous Sodium-aluminosilicate With an Average Particle Size of 14.83 Micrometer in a Neutral Silicate Liquor The same procedure using 153.74 g of Sodium-Aluminosilicate (Material G) and 500 g of neutral silicate liquor (Material A) was applied as previously to produce a suspension containing 17.23 wt. % amorphous Sodium-aluminosilicate.

Composition and characteristics of the suspension:

| | |
|---|---|
| Amorphous Sodium-aluminosilicate content (bone dry) | 17.23% |
| SiO₂ content (in aqueous phase) | 20.51% |
| Na₂O content (in aqueous phase) | 6.31% |
| Silicate content (in aqueous phase) | 26.81% |
| Total H₂O | 55.96% |
| Density | 1450 g/l |

Calculated silicate content in liquid phase, disregarding possible absorbtion by the amorphous Sodium-aluminosilicate.: Silicate (bone dry) content in liquid phase: 32.39%

Stability:

| Days | sediment | Phase separation |
|---|---|---|
| 1 | 0 | 0 |
| 4 | 0 | 36 ml |
| 5 | 0 | 118 ml |

Surprisingly, the stability of this suspension with respect to setting is borderline, although the average particle size is 14.83 micrometer.

This is explained by assuming that the physical structure of this amorphous Sodium-aluminosilicate is more open, having more pore volume.

Apparently not all amorphous silicates are reacting with the silicate liquor, as the amorphous Aluminosilicate used in this EXAMPLE is relatively inert. A possible explanation could be that the raw materials used to produce the other more reactive amorphous silicates were all Metal salts of Aluminium, Calcium and Magnesium reacting with Sodiumsilicate at a relatively low pH (below pH=9), while the relatively inert amorphous Sodium-Aluminosilicate is obtained by reacting a solution of the highly alkaline sodium-aluminate with a sodium-silicate solution under highly alkaline conditions, at a pH above 12.

Summary of Results of Examples 1–14

| EX. | Zeol. Type | Zeolite Part.size aver. (µm) | Zeol. Conc. D50 (µm) | Zeol. Type (Bone dry) (wt. %) | Silicate/NaCL *) Concentr. N/A/S | Salt Conc. In Solution used (Wt. %) | Total Dry.S. in Susp. (Wt. %) | Stabil. Susp. in Susp. (Wt. %) | Nr. |
|---|---|---|---|---|---|---|---|---|---|
| 1 | P | 0.92 | 1.22 | 9 | N | 35.06 | 31.55 | 40.55 | + |
| 2 | P | 0.92 | 1.22 | 18 | N | 35.06 | 28.05 | 46.05 | + |
| 3 | P | 0.92 | 1.22 | 27 | N | 35.06 | 24.54 | 51.54 | + |
| 4 | P | 3.18 | 3.22 | 14.6 | N | 35.06 | 22.69 | 37.29 | +/− |
| 5 | P | 0.92 | 1.22 | 14.6 | N | 35.06 | 22.69 | 37.29 | + |
| 6 | 4A | 2.75 | 2.79 | 16 | N | 35.06 | 28.05 | 44.05 | +/− |
| 7 | P | 0.92 | 1.22 | 18 | A | 45.00 | 36.00 | 54.00 | + |
| 8 | P | 3.18 | 3.22 | 14.6 | A | 45.00 | 29.10 | 43.70 | + |

-continued

Summary of Results of Examples 1–14

| | | Zeolite | Zeol. | | | Salt | Total | Stabil. | |
| | | Part.size | Conc. | Type | Silicate/NaCL *) | Conc. | Dry.S. | Susp. | |
| | Zeol. | aver. | D50 | (Bone dry) | Concentr. | In Solution | in Susp. | in Susp. | |
| EX. | Type | (μm) | (μm) | (wt. %) | N/A/S | used (Wt. %) | (Wt. %) | (Wt. %) | Nr. |
|---|---|---|---|---|---|---|---|---|---|
| 9 | P | 0.92 | 1.22 | 18 | A | 30.00 | 24.00 | 42.00 | +/− |
| 10 | P | 3.18 | 3.22 | 14.6 | A | 30.00 | 19.40 | 34.00 | +/− |
| 11 | P | 0.92 | 1.22 | 18 | N | 23.37 | 18.7 | 36.7 | +/− |
| 12 | P | 0.92 | 1.22 | 18 | N | 17.53 | 14.02 | 32.02 | − |
| 13 | P | 0.92 | 1.22 | 18 | N | 11.69 | 9.35 | 27.35 | − |
| 14 | P | 0.92 | 1.22 | 18 | S | 26.31 | 21 | 39 | +/− |

*) N = Neutral Silicate;
A = Alkaline Silicate;
S = Sodiumchloride solution.

This table demonstrates a relationship between stability salt concentration. However, it seems more realistic to assume that the stability is related to the concentration of the salt (Silicate or Sodium chloride) in the liquid phase of the suspension. The table given above however, represents the salt content of the suspension including the solid phase.

In the following table the salt concentration is corrected for the solids (zeolite) content and therefore represents the calculated salt content in the liquid (aqueous) phase of the suspension.

| EXP Nr. | Zeol. type | Zeol. conc. (WT. %) | Zeol. av.PS (μm) | Silicate/ NaCl type | Salt Concentr. in liquid phase (WT. %) | Stability slurry |
|---|---|---|---|---|---|---|
| 1 | P | 9 | 0.92 | N | 34.67 | + |
| 2 | P | 18 | 0.92 | N | 34.21 | + |
| 3 | P | 27 | 0.92 | N | 33.62 | + |
| 4 | P | 14.6 | 3.18 | N | 26.57 | +/− |
| 5 | P | 14.6 | 0.92 | N | 26.57 | + |
| 6 | 4A | 16 | 2.75 | N | 33.31 | +/− |
| 7 | P | 18 | 0.92 | A | 43.90 | + |
| 8 | P | 14.6 | 3.18 | A | 34.07 | + |
| 9 | P | 18 | 0.92 | A | 29.27 | +/− |
| 10 | P | 14.6 | 3.18 | A | 22.72 | +/− |
| 11 | P | 18 | 0.92 | N | 22.80 | +/− |
| 12 | P | 18 | 0.92 | N | 17.10 | − |
| 13 | P | 18 | 0.92 | N | 11.40 | − |
| 14 | P | 18 | 0.92 | S | 25.61 | +/− |

This table shows the following:
* A stable suspension of a zeolite cannot be produced when the concentration of the salt in the liquid phase of the suspension is below approximately 20% by weight, even when the average particle size of the zeolite is 0.9 micrometer.
* The sodiumchloride concentration (26.3%) in the liquor used in EXAMPLE 14 is around its saturation point. Therefore sodiumchloride is just not suitable as a salt on its own.
* Alkaline Silicate is suitable, as it can reach concentrations over 50 wt. % in aqueous solutions.

Example 17

Preparation of a Suspension of 20% of Talcum Powder in a Neutral Silicate Liquor The same procedure using 400 g of a neutral Sodium-silicate liquor (A) and 100 g Talcum powder (I) was applied as previously to produce a suspension containing 20 wt. % of talcum powder.

The suspension obtained had a density of 1280 g/l.

Product Assessment

It was observed, that the talcum powder apparently contained too much air, which was difficult to be removed under our standard stirring conditions. Therefore it was not possible to obtain a good homogeneous suspension under these less intensive stirring conditions.

Example 18

Preparation of a Suspension of 20% of Graphite Powder in a Neutral Sodium-silicate Liquor The same procedure using 400 g of a neutral Sodium-silicate liquor (A) and 100 g graphite powder (J) was applied as previously to produce a suspension, containing 20 wt. % Graphite powder.

The suspension obtained had a density of 1232 g/l.

The suspension was stable, although after several days storage it could be observed, that some (a trace) graphite had gathered on the surface, probably also as a result of some air inclusion.

Examples 19 and 20

Preparation of Suspensions of Respectively 15% and 18% of Amorphous Aluminium-silicate Powder in a Neutral Sodium-silicate Liquor The same procedure was applied as previously to produce suspensions, containing respectively 15 wt. % (Ex. 19) and 18 wt. % (Ex. 20) Aluminium-silicate powder.

| Ingredients used: | | |
|---|---|---|
| * Neutral Sodium-silicate liquor (A) | | |
| * Amorphous Aluminium-silicate (H) | | |
| Quantities used: | Ex. 19 | Ex. 20 |
| Neutral Silicate liquor (g) | 416.7 | 400 |
| Aluminium-silicate (g) | 83.3 | 100 |

The suspension obtained in Example 19 had a density of 1408 g/l. Both suspensions were stable during approx. 1 day. Gelling took place then, Apparently the amorphous Aluminium-silicate is chemically not inert in the silicate liquor.

Example 21

Preparation of a Suspension of 18% of a P-type Zeolite With an Average Particle Size of 0.92 Micrometer in a Potassium-silicate Liquor With a Molar Ratio $SiO_2/K_2O$ of 3.9

The same procedure was applied as previously to produce a suspension containing 18 wt. % of a P-type zeolite.

| Ingredients Used: | | |
|---|---|---|
| Potassium-silicate liquor (O) | (g) | 400 |
| P-type zeolite powder (C) | (g) | 100 |

The suspension obtained had a zeolite content (dry basis) of 18 wt. % and a density of 1388 g/l. The suspension was completely stable.

Example 22
Preparation of a Suspension of 18% of a P-type Zeolite With an Average Particle Size of 0.92 Micrometer in a Potassium-silicate Liquor With a Molar Ratio $SiO_2/K_2O$ of 2.2

The same procedure was applied as previously to produce a suspension containing 18 wt. % of a P-type zeolite.
Ingredients Used
Potassium-silicate liquor (P) was first diluted with demineralised water to a Dry Solid content of 40%. 400 g of this diluted Potassium-silicate liquor was used and 100 g of the zeolite powder (C).

The suspension obtained had a zeolite content (dry basis) of 18 wt. % and a density of 1512 g/l.

The suspension was also stable.

Example 23
Preparation of a Suspension of 18% of Amorphous Calcium-silicate in a Neutral Sodium-silicate Liquor The same procedure was applied as previously to produce a suspension, containing 18% calciumsilicate powder (K) in neutral silicate liquor (A). 100 g Calcium-silicate (K) and 400 g Sodium-silicate liquor (A) were used. The suspension had a density of 1444 g/l. The suspension started gelling after 1 day.

Example 24
Test on Adhesion of Filter Paper
Materials used:
2 pieces of laboratory filter paper
material from Example 2 (18% P-type zeolite in neutral silicate liquor)
A few drops of the suspension were applied to one surface of one piece of filter paper. The other piece of filter paper was put on the first one and the filter papers were pressed together by hand, whereby the suspension was spread over a surface area of approximately 2 cm$^2$.

Clear immediate tack could be observed and within 5 minutes the suspension had sufficiently dried and it was then impossible to separate the papers without tearing them.

Example 25
Adhesion Test With Writing Paper
The same test as in Example 24 was carried out with standard commercially available paper sheets from a writing pad.

The same observation could be made: Good adhesion (tack) and strong binding within 5 min, after which it was also not possible to separate the sheets without tearing them. Excellent and fast adhesion was obtained.

Example 26
Manufacture of Multilayer Cardboard Tubes
With a spiral winder comprising a paper breaking and single sided cascade adhesive application system with variable paper feed speed between 17–60 m/min, three types of tubes were produced.

Type 1: outer diameter 79 mm, inner diameter 70 mm (4,5 mm wall thickness, 8 plies standard Schrenz (Germany) cardboard, COBB value above 200 gsm, 0.5–0.6 mm, with outer ply of thin white paper). Cut off lengths 1,7 m, cutter time 10–15 s.

Type 2: outer diameter 75 mm, inner 70 mm (2.4 mm wall thickness, 4 plies standard Schrenz cardboard, COBB value above 200 gsm, 0.5–0.6 mm, with outer ply of thin brown paper). Cut off length 2 m.

Type 3: outer diameter 76 mm, inner diameter 70 mm (5 plies standard high quality core-board, COBB value approximately 30 gsm, without an outside wrap).

Adhesive formulation: 1000 kg straight sodium silicate (MR 2.950, 39.50 Be (20° C.). Adjusted with A24 zeolite to a viscosity of 1'20" (DIN cup B funnel 4 mm), which in this case was 300 kg A24 (23.02% wt). The final density of the mixture was 1520 kg/m$^3$. The material was mixed in 100 l drums until the zeolite was properly dispersed (checked visually). The production took place 5 days prior to the test. The suspension formed was stored for 4 days under ambient conditions (17° C.) and remixed the day before testing. Application temperature: 21° C.
Test Results
All tube types could be manufactured without problems. The difficulties to glue type 3 tube encountered with adhesives from the state of the art were not observed. Paper feed speed could be risen till the maximum speed without occurrence of paper slip. The adhesive application related to paper weight was varied from 8 to 20% without occurrence of slip. The tubes were dried at 105° C.

Using 20% adhesive (related to the paper weight) the weight of a 31 cm tube was 297.48 g directly after production. After four days drying at ambient temperature the weight decreased to 241.83 g (6.07% weight loss). In a similar experiment, using 8% adhesive (based on paper weight) the weight loss was 3.50%.

Compared to tubes, produced with an adhesive from the state of the art (PVA from Scholten Lijmen) the hardness and therefore the maximum crush strength of the tubes improved with more than 10%. Also, the strength builds up at lower tube deformation and stays constant at higher deformations (measured up to a deformation of 9 mm on an outer diameter of 100 mm). Cardboard tubes produced with PVA or dextrine as adhesives were easily ignited with a gas burner with a medium flame. The fire was sustained and the cardboard completely burnt. The same cardboard tubes could however not be ignited even by a gas burner at maximum temperature. When the burner was removed there was no sustained fire/flame.

Example 27
Adhesion Test With 2 Pieces of Wood
Materials used:
suspension of Example 2
2 pieces of wood with rough surfaces having the same dimensions (18 mm×10 mm×64 mm)
A very thin layer sufficient to just cover one wood surface (18 mm×64 mm) was applied on one piece of wood. The wood pieces were then immediately pushed together by hand and left for approximately 1 min.

Considerable tack could already be observed then. After approximately 10 min it was already extremely difficult to separate the pieces. High force was needed, although drying was not yet even complete. The pieces could again be fixed together without renewed impregnation. After another 10 min it was even more difficult to separate the pieces. Strong force from only a corner point was needed.

The experiment was repeated using the same pieces of wood (using the opposite sides) and the same procedure. The binding strength was assessed after 24 h. Strong men were then not able to separate the pieces any more by hand.

Afterwards, the bounded wood pieces were put in a glass of 0.6 l, filled with water in order to assess whether this wetting would negatively influence the binding strength.

After 1 hour presence in the water, it was still not possible to separate the wood pieces. After 5 hours it was possible to separate the wood pieces again. This shows, that for normal use, drying under atmospheric conditions without the use of a hardener gives a sufficiently stable binding. However in case the particles bound together by such a suspension are in contact with water it is preferred that a binder is used neutralising the silicate and thus rendering the adhesive insoluble. A preferred binder is amorphous Silica.

The adhesive according to the invention therefore provides an extremely good adhesion system for wood.

Advantages are:

The wood surfaces need no pre-cleaning

The wood surfaces need no smoothening

The wood surfaces may be wet/humid and need no drying

No organic materials needed and no solvents

Examples 28 and 29

Adhesion Test With Bricks Having Very Rough Surfaces

Materials used:

4 bricks of a type with very rough surfaces, as often used for the inner wall of houses, in case of double outside walls or for industrial buildings. The surface of the brick was having grains sticking out of the surface up to around 2 mm.

Brick dimensions: 9.8 cm×21 cm×5 cm.

Suspension of EXAMPLE 2 for EXAMPLE 28

Suspension of EXAMPLE 3 for EXAMPLE 29

A layer of approx. 2 mm. of the suspension was brought on the surface (21 cm×9.8 cm) of one brick and a second brick was immediately placed with the same surface on top of the surface covered with the suspension.

After 5 minutes the brick of EXAMPLE 29 lying on top (top brick) could already be lifted, while the lower brick remained fixed to it. This was not yet the case with the bricks bounded by the suspension of EXAMPLE 2 in EXAMPLE 28, in which EXAMPLE the lower brick fell off. As the suspension was not yet dry, the bricks could be bound together again. After approx. 30 minutes also the bricks in EXAMPLE 28 were sufficiently bound, that the lower brick did not fall off any more. After a few hours already strong binding was realized and no separation was realized, when exerting maximum force by hand in EXAMPLE 21.

In EXAMPLE 28, using the suspension of EXAMPLE 2, containing 18% zeolite P, it was observed, that there was clear shrinkage of the suspension between the bricks, while this was minimal in EXAMPLE 29, using the more concentrated suspension of EXAMPLE 3, having a content of 27% zeolite P.

These tests demonstrate, that suspensions of zeolite in silicate solutions according to the invention, provide excellent adhesives for binding bricks and that increasing the zeolite concentration gives better results.

Example 30

Repair of Leather Shoe Sole By Adhesion Using a Silicate Suspension

Material used:

Suspension from EXAMPLE 3, i.e.:

Suspension of zeolite of a P-type, Zeocros CG 180 in neutral silicate containing 27% by weight zeolite.

The suspension of Example 3 is used to repair a shoe of which the sole had turned loose during prolonged wearing.

The used shoe and the used sole, which had turned loose during wearing was not cleaned, having a clearly dirty surface (with soil). The repair was realized as follows:

An extremely thin layer of the suspension of EXAMPLE 3 was brought on the leather sole using a spatula. The sole was pressed on the shoe by hand. The excess of suspension was pressed out from the space between shoe and sole and removed, using a cloth. The sole was pressed on the shoe during 10 minutes and then already well stuck to the shoe.

After 24 h, the sole was well fixed to the shoe and was carried during more than 3 weeks without any sign of losing binding strength.

Example 31

Addition of amorphous Silica to a neutral Sodium-silicate liquor.

| | Material Nr.: | Dry Solid content (wt. %) |
|---|---|---|
| Materials used: | | |
| Neutral Sodiumsilicate liquor | A | 35.06 |
| Amorphous Silica: Lucilite | L | 34.78 |
| Amorphous Silica: Gasil HP250 | M | 93.49 |
| Amorphous Silica: Microsil ED | N | 89.37 |
| Amorphous Silica: Stabifix Super | Q | 94.6 |

Procedure

These silicas were suspended in the neutral silicate liquor as described in Example 1.

A range of suspensions was made in which the varying quantities of silica were added to the silicate liquor.

It was not possible to produce suspensions adding more than approximately 15% by weight on a dry basis of silica.

Suspensions Produced and Behaviour During Storage (The $SiO_2$ and Sodiumsilicate contents of the suspensions are expressed on bone dry basis)

| Material | L | | | | M | | | N | | | Q | | |
|---|---|---|---|---|---|---|---|---|---|---|---|---|---|
| Sample Nr. | L1 | L2 | L3 | L4 | M1 | M2 | M3 | N1 | N2 | N3 | Q1 | Q2 | Q3 |
| $SiO_2$ (wt. %) | 4.4 | 7.8 | 10.5 | 12.7 | 4.7 | 9 | 12.9 | 4.7 | 9 | 12.8 | 4.7 | 9 | 12.9 |
| Silicate (wt. %) | 31 | 27 | 25 | 22 | 33 | 32 | 30 | 33 | 32 | 30 | 33 | 32 | 30 |
| Gelling Time (h) | <1/2 | <1/2 | <1/2 | <3/4 | 15 | <15 | <15 | >48 | 24 | 20 | 15 | <15 | <<15 |
| Gel type, 1 day *) | s | h | h | mh | l | s | s | l | s | s | l | s | h |
| Gel type, 2 days | s | h | h | h | l | s | s | l | s | h | l | s | h |

-continued

| Material | L | | | | M | | | N | | | Q | | |
|---|---|---|---|---|---|---|---|---|---|---|---|---|---|
| Sample Nr. | L1 | L2 | L3 | L4 | M1 | M2 | M3 | N1 | N2 | N3 | Q1 | Q2 | Q3 |
| Gel type, 4 days | s | h | h | h | l | h | h | s | h | h | l | h | h |
| Gel appearance *) | t | t | t | o | — | g | g | — | — | t | g | g | g |

*) After 1 day, the gel was assessed visually and after 1, 2 and 4 days on strength by pressing a rod manually into the gel and assessing the pressure needed.
Following symbols were used to characterize the gel:
l = liquid;
s = very-soft;
mh = medium-hard and
h = hard.
t = translucent;
g = greyish;
o = opaque Summarizing Material L (Lucilite) is a hydrogel and most soluble and most reactive, resulting in fastest and most efficient gelling. The other silicas also show different gelling efficiencies. It was observed, that at increasing silica content gelling is more efficient and the gel obtained becomes harder.

It can be assumed, that the silica dissolution process for Material L, being highly reactive will have reached its end point within 1 day, while the other silicas were still reacting further.

Sample L4 shows, that at an apparent excess level of silica the gel becomes opaque and again softer. It was concluded from this, that there is an optimal silica addition level giving maximum hardness around the 10% Silica level. This means 40 wt. % relative to the neutral silicate (Total effective Molar Ratio: $SiO_2/Na_2O$, then being around 4.7).

Example 32, 33 and 34

Addition of Amorphous Silica to a Neutral Sodium-silicate Liquor at 50° C. and 80° C.

In order to demonstrate the influence of temperature on the gelation time, suspensions of Silica in a neutral Sodium-silicate liquor were produced at 50° C. and at 80° C.

Procedure

A mortar, which was preheated at 50° C. for Examples 31 and 32 or at 80° C. for Example 33, neutral Sodium-silicate liquor (Material A) was added and brought to the same temperature, Silica was subsequently added and shortly milled in order to realize fast mixing.

The suspension obtained was quickly transferred into a beakerglass of 250 ml kept at 50° C. for Examples 31 and 32 and at 80° C. for Example 33 in a waterbath.

| Example Nr. | 32*) | 33**) | 34**) |
|---|---|---|---|
| Materials used: | | | |
| Material (Silicate) | A | A | A |
| Silicate Liquor (g) | 100 | 100 | 100 |
| Silica Material Nr. | L | M | M |
| Silica (as is) (g) | 28.75 | 10.7 | 10.7 |
| Storage Temperature (° C.) | 50 | 50 | 80 |
| Start of gelling (min)***) | 2 | 10 | 3 |

*)Example 31 is based on the same raw materials and has the same composition as sample L2 of Example 30, which was tested at room temperature (approx. 20° C.). Gelling of sample L2 at room temperature started after approximately 30 minutes.
**)Examples 32 and 33 are based on the same raw materials and have the same composition as sample M2 of Example 30, which was also tested at room temperature. Gelling of sample M2 at 20° C. started very slowly and a real start point could not be defined (after several hours).
***)Gelling assessment at 50° C. and 80° C.:
Gelling was visually observed as well as by regularly assessing the strength needed to enter a glass rod in the gelling suspension.

Summarizing
1. Increasing the storage- (or "curing"-) temperature decreases the time needed for gelling or solidifying (or: "curing" or hardening").
2. Addition of amorphous silica offers an excellent means to gel (or "cure" or "harden") a silicate liquor.
3. Curing silicate liquors using amorphous silica also renders the hardened product less soluble in water, creating a more permanent "cure" even when in contact with water.

Examples 35–39
Addition of Amorphous Silica to Suspensions of Zeolite of a P-type in a Neutral Silicate Liquor Procedure A suspension of 15% by weight of zeolite in neutral Sodiumsilicate liquor was prepared, following the procedure as in EXAMPLE 1 using the same beakerglass and following materials:

| Zeolite in silicate suspension: | |
|---|---|
| Silicate liquor (g) (Material A) | 500 |
| Zeolite powder (g) (Material C) | 100 |
| Zeolite content (wt. %) (Bone dry basis) | 15 |

This suspension was split up in 120 g portions to which amorphous silica was added at room temperature in a mortar.

After intensive milling in the mortar, the samples were gathered in small beakerglasses for assessment of the gelling process.

| The following tests were carried out: | | | | | |
|---|---|---|---|---|---|
| EXAMPLE Nr. | 35 | 36 | 37 | 38 | 39 |
| Zeolite suspension (g) | 120 | 120 | 120 | 120 | 120 |
| Amorphous Silica: | | | | | |
| Material Nr. | L | L | L | M | M |
| weight (as is) (g) | 14.4 | 28.8 | 43.1 | 5.37 | 10.7 |
| Final Composition Slurry | | | | | |
| Silicate (dry basis) (wt. %) | 26.1 | 23.6 | 21.5 | 28.0 | 26.8 |
| Zeolite (dry basis) (wt. %) | 13.4 | 12.1 | 11.0 | 14.4 | 13.8 |
| Silica (dry basis) (wt. %) | 3.7 | 6.7 | 9.2 | 4.0 | 7.7 |
| Water content (wt. %) | 56.8 | 57.6 | 58.3 | 53.6 | 51.7 |
| Gelling *) | | | | | |
| gelling start (min.) | 30 | 30 | 30 | | |
| after 1 day | s.g | g | h | s.g | h |
| after 2 days | s.g | h | h | s.g | h |
| after 3 days | s.g. | h | h | s.g | h |

*) Gelling is specified as: s.g. = soft gel;
g = gel:
h = hard.

The gelled suspensions of EXAMPLES 36, 37 and 39 were harder than those of the gelled suspensions L2, L3, L4, M2 and M3 of EXAMPLE 31, showing the additional strengthening resulting from the zeolite additionally present in the suspension.

Exerting a similar force on a thin glass rod in hardened (cured) gels containing 11–14.4 wt. % additional zeolite reduced the penetration by a factor of roughly 3–4.

What is claimed is:

1. A suspension having a high storage stability comprising an aqueous silicate solution and a filler material, wherein the suspension has a silicate content of at least 20% by weight, the filler material has an average particle size of 0.8–15 μm and a specific weight of below 2.75 kg/l, the filler being selected from the group consisting of:
   a) zeolites,
   b) fine particulate or fibrous amorphous inorganic material being relatively inert in an alkaline aqueous solution, comprising amorphous alkali metal alumino silicate, and
   c) mixtures thereof, and
wherein said suspension has a high storage stability in the absence of a stabilizer.

2. Suspension according to claim 1, characterized in that the zeolite is of the P-type.

3. Suspension according to claim 1, characterized in that the amorphous inorganic material comprises synthetic amorphous alkali metal alumino silicate.

4. Suspension according to claim 1, characterized in that the average particle size of the filler material is comprised between 0.8–10 μm.

5. Suspension according to claim 1, characterized in that the content of the filler material is comprised between 2–50% by weight.

6. Suspension according to claim 1, characterized in that the $SiO_2/M_2O$-molar ratio, M being an alkali metal or ammonium, of the aqueous silicate solution is comprised between 1–4.5.

7. Suspension according to claim 1, characterized in that the aqueous silicate solution has a silicate content of at least 25% by weight.

8. Adhesive composition comprising a suspension according claim 1.

9. Adhesive composition according to claim 8, characterized in that the $SiO_2/M_2O$-molar ratio, M being alkali metal or ammonium, of the aqueous silicate solution is comprised between 2.8–4.2.

10. Adhesive composition according to claim 8, characterized in that the average particle size of the filler material is below 3 μm.

11. Drilling fluid comprising a suspension according to claim 1.

12. Sewer renovation fluid comprising a suspension according to claim 1.

13. Binder composition comprising a suspension according to claim 1.

14. Waste fixation composition comprising a suspension according to claim 1.

15. Fixation and hardening composition for ground surfaces comprising a suspension according to claim 1.

16. Concrete cement composition for construction comprising a suspension according to claim 1.

17. Spray-coating composition comprising a suspension according to claim 1.

18. Paper filler composition comprising a suspension according to claim 1.

19. A method of hardening a silicate containing suspension according to claim 1 comprising mixing said silicate containing suspension with a hardener system.

20. The suspension according to claim 4, wherein the average particle size of the filler material is between 0.8 and 5 μm.

21. The suspension according to claim 4, wherein the average particle size of the filler material is between 0.8 and 4 μm.

22. The suspension according to claim 4, wherein the average particle size of the filler material is between 0.8 and 2 μm.

23. The suspension according to claim 5, wherein the content of filler materials is in the range 10 to 40 percent by weight.

24. The suspension according to claim 5, wherein the content of filler material is in the range 10 to 30 percent by weight.

25. The suspension according to claim 6, wherein the $SiO_2/M_2O$ molar ration, M being an alkali metal or ammonium, is between 2 and 4.

26. The suspension according to claim 6, wherein the $SiO_2/M_2O$ molar ration, M being an alkali metal or ammonium, is between 2.6 and 4.

27. The method for the manufacture of paper article comprising spreading a suspension according to claim 1 over at least a part of a surface of a paper sheet and then covering said sheet with a second paper sheet.

28. The method according to claim 19, wherein the hardener system is selected from the group consisting of amorphous silica and amorphous metal silicate.

* * * * *